(12) United States Patent
Damery et al.

(10) Patent No.: US 7,976,786 B2
(45) Date of Patent: Jul. 12, 2011

(54) PORTABLE GAS GENERATING DEVICE AND ELECTRICAL FUEL CELL POWER SUPPLY COMPRISING SUCH A DEVICE

(75) Inventors: Emmanuel Damery, Crolles (FR); Jerome Delmas, Grenoble (FR); Jean-Yves Laurent, Domene (FR); Bruno Valon, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 320 days.

(21) Appl. No.: 12/171,561

(22) Filed: Jul. 11, 2008

(65) Prior Publication Data

US 2009/0017347 A1 Jan. 15, 2009

(30) Foreign Application Priority Data

Jul. 13, 2007 (FR) ...................................... 07 56495

(51) Int. Cl.
*B01J 8/02* (2006.01)
*B01J 10/00* (2006.01)
*B01J 19/00* (2006.01)
*C01B 3/24* (2006.01)
*C01B 3/26* (2006.01)

(52) U.S. Cl. ......... 422/211; 422/129; 48/61; 423/648.1; 423/650

(58) Field of Classification Search .................. 422/221, 422/129, 211; 429/515, 416; 48/61; 423/648.1, 423/650; 436/37
See application file for complete search history.

(56) References Cited

U.S. PATENT DOCUMENTS

| 3,601,827 | A | * | 8/1971 | Miller .............................. 441/30 |
| 3,615,252 | A | * | 10/1971 | DiPietro ....................... 422/120 |
| 4,155,712 | A | | 5/1979 | Taschek |
| 4,944,527 | A | * | 7/1990 | Bishop et al. ................. 280/741 |
| 5,523,178 | A | * | 6/1996 | Murakami et al. .............. 429/53 |
| 6,746,496 | B1 | | 6/2004 | Kravitz et al. |
| 2002/0121214 | A1 | * | 9/2002 | Ledys et al. ................... 102/477 |
| 2005/0158595 | A1 | * | 7/2005 | Marsh et al. ..................... 429/19 |
| 2006/0147776 | A1 | * | 7/2006 | Sarata et al. ..................... 429/30 |
| 2006/0185242 | A1 | * | 8/2006 | Cha et al. .......................... 48/77 |
| 2006/0191199 | A1 | | 8/2006 | Rosenzweig et al. |
| 2007/0020172 | A1 | | 1/2007 | Withers-Kirby et al. |
| 2007/0264190 | A1 | * | 11/2007 | Zhang et al. ............... 423/648.1 |

FOREIGN PATENT DOCUMENTS

| EP | 1 396 471 A2 | 3/2004 |
| GB | 2 165 532 A | 4/1986 |
| WO | WO 2004/018352 A1 | 3/2004 |
| WO | WO 2005/049485 A1 | 6/2005 |
| WO | WO 2006/091954 A2 | 8/2006 |

* cited by examiner

*Primary Examiner* — Walter D Griffin
*Assistant Examiner* — Natasha Young
(74) *Attorney, Agent, or Firm* — Oblon, Spivak, McClelland, Maier & Neustadt, L.L.P.

(57) ABSTRACT

A device for generating gas by placing a liquid reactant in contact with a solid element, including: a liquid reactant tank, a reaction chamber configured to contain the solid element, an injector configured to inject the liquid reactant onto the solid element, and an outlet port configured to collect the gas generated in the reaction chamber, wherein the tank and the reaction chamber are separated in a sealed manner by a mobile wall, the mobile wall including an outlet port for collecting the gas generated in the reaction chamber, and wherein the injector passes through the mobile wall and configured to move into the solid element.

23 Claims, 4 Drawing Sheets

– 1 –

PORTABLE GAS GENERATING DEVICE AND ELECTRICAL FUEL CELL POWER SUPPLY COMPRISING SUCH A DEVICE

PRIOR ART

This invention relates to a portable gas generating device, and more specifically to a portable hydrogen generator, in particular for a fuel cell comprising such a gas generator, in particularly a hydrogen generator and electrically powered portable elements comprising such a fuel cell.

The search for a clean energy source is becoming increasingly important, in particular due to diminishing oil resources as well as the impact of fossil fuel use on the environment. Fuel cells, in particular hydrogen fuel cells, make it possible to produce electricity with minimal impact on the environment. These fuel cells use hydrogen as a raw material to produce electricity by electrochemical reaction.

Hydrogen can be supplied either by a hydrogen tank in the form of pressurized gas, or in liquid form, but this storage requires high-capacity tanks. Moreover, they must be especially secure because hydrogen is very flammable. Consequently, this type of storage cannot be used in portable, and especially small, devices.

It is also possible to use metal compounds containing hydrogen that is released by energy exposure. The type of reversible reaction enabling hydrogen to be stored is the following:

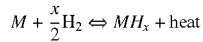

$$M + \frac{x}{2} H_2 \Leftrightarrow MH_x + \text{heat}$$

To release hydrogen, an external energy supply is therefore necessary, in the form of heat. However, the overall energy production efficiency is relatively low.

Another alternative is to produce hydrogen as it is needed by mixing reactants, with one of the reactants being a hydride.

This type of hydrogen power supply therefore appears to be especially suitable for powering micro fuel cells in portable equipment.

A particularly beneficial solution for producing hydrogen on demand is to react water, more generally an aqueous solution with a hydride in the presence of a catalyst, for example NaBH4 or Mg(BH4)2 according to the following reactions:

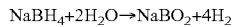

$$NaBH_4 + 2H_2O \rightarrow NaBO_2 + 4H_2$$

or

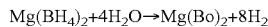

$$Mg(BH_4)_2 + 4H_2O \rightarrow Mg(Bo)_2 + 8H_2$$

However, this method of preparing hydrogen implements a heterogeneous reaction between liquid and solid, and consequently the kinetics of this reaction are inferior to those of a reaction between two compounds in the same state. Moreover, in the case of a small reactor, it is difficult to envisage providing means for agitating the liquid in order to improve the reaction kinetics.

Document WO 2004/018352 describes a system for producing hydrogen by contact between an aqueous solution of a metal hybrid salt with a hydrogen generating catalyst, which system involves introducing the metal hybrid salt and the catalyst into a reaction chamber, in which the catalyst is supplied by means of a pump. This system is therefore relatively bulky, and requires an external electrical energy supply.

Document US 2006/0191199 describes a hydrogen generator comprising a water tank and a chamber containing a solid reactant, for example sodium borohydride (NaBH4). A valve is provided between the water tank and the chamber comprising the solid reactant so as to regulate the water supply to the chamber containing the solid reactant. This regulation is achieved by using the hydrogen gas pressure produced in the chamber containing the solid reactant.

This hydrogen generating device is relatively compact, but it does not enable the reaction kinetics between the water and the sodium borohydride to be optimized since the reaction kinetics are slowed by the presence of the hydrogen produced in the reaction chamber.

It is therefore an objective of this invention to provide a compact and efficient hydrogen generating device, enabling an on-demand production of hydrogen, and more generally of as in all of the positions of the generator, and therefore the activation and stopping are controlled in a simplified manner.

An objective of the present application is also to provide a device for supplying electrical energy to portable equipment, allowing for compactness and efficiency in the electrical power supply.

DESCRIPTION OF THE INVENTION

The objectives mentioned above are achieved by means of a gas generator comprising an aqueous solution tank and a reaction chamber, in which the reaction chamber contains a solid compound capable of causing the release of a gas when it comes into contact with the aqueous solution, and means for injecting the aqueous solution onto the solid element in a predetermined area, which injection means are such that said predetermined injection area can be modified, so as to avoid limiting the continuation of the reaction by reaction products, in particular the gas generated.

In other words, the invention involves modifying the place where the aqueous solution is injected onto the solid on each injection, discretely or continuously so as to avoid "fouling or chocking of the reaction area".

In a first embodiment, the hydrogen generating device is controlled manually, for example by means of a thumb wheel arranged outside a housing of the hydrogen generating device containing the tank and the reaction chamber. In an alternative embodiment, the injection is controlled by an electric motor.

In an advantageous embodiment, the hydrogen generation is controlled automatically by the hydrogen gas produced in the reaction chamber. The chemical reactor thus provided is capable of operating in all positions with reduced bulk, and the activation and stopping of the hydrogen production are controlled manually or automatically.

The solid reactant can, for example, by a metal borohydride or a mixture of a plurality of reactants to which a catalyst or a reaction activator can be added. The aqueous solution can also advantageously contain a reaction activator solubilized in the aqueous solution.

In a third embodiment, the reaction chamber contains a solid catalyst and the tank can contain aqueous solution with hydride.

The invention therefore involves moving the leading edge of the reaction between the solid compound and the liquid compound so as to prevent the reaction from being stopped by clogging of the reactants.

For example, the liquid, in particular the aqueous solution, is injected onto the solid component by means of a tube of which the end moves with respect to the solid component as the liquid reactant is introduced into the reaction chamber. Consequently, the liquid always reacts with a new area of the solid component.

The device also has the advantage of implementing stable products separated before the reaction, although a solution, even when stabilized, breaks down over the long term. Consequently, the generator can be preserved for a longer time and work when needed.

It is possible to use pasty or solid reaction products, without the risk of disrupting the fluid circulation. Moreover, a device with a constant volume is preserved since the reaction products, in particular the hydrogen, replace the fluid.

In the first and second embodiments, the injection of the aqueous solution onto the solid is performed without an auxiliary pump. Consequently, this device works without providing electrical energy.

The subject-matter of the present invention is mainly a device for generating gas by placing a liquid reactant in contact with a solid element, comprising a liquid reactant tank and a reaction chamber intended to contain the solid element, wherein the tank and the reaction chamber are separated in a sealed manner by a mobile wall, with an outlet port for collecting the gas generated in the reaction chamber and means for injecting the liquid reactant onto the solid element, which injection means pass through the mobile wall and are capable of moving into the solid element.

The injection means are advantageously integrated in movement with the mobile wall. Thus the movement of the injection means occurs simultaneously with the reduction in the volume of the tank.

The injection means can comprise at least one tube passing through the mobile wall and connecting the tank and the reaction chamber.

In one embodiment, the mobile wall is a piston, and the movement of the piston in a direction of reduction of the volume of the tank causes a flow of the liquid reactant from the tank to the reaction chamber.

In another embodiment, the tank is delimited by a flexible tank capable of being deformed so as to cause the liquid reactant to flow from the tank to the reaction chamber, which makes it possible to facilitate the sealing of the tank.

The mobile wall is connected to an endless screw mechanism. This mechanism can comprise a shaft equipped with an external threading cooperating with an internal threading formed in an internal wall of the injection tube, in which the shaft is capable of being rotated, and the liquid reactant can flow between the tube and the shaft.

A thumb wheel at one end of the shaft capable of being turned manually or by means of an electric motor engaged with an end of the shaft can be provided in order to move the mobile wall.

In one embodiment, the device comprises a non-return valve between the tank and the reaction chamber, means for preventing movement of the mobile wall in a direction of increasing the volume of the tank, and means capable of being deformed under the pressure of the gas generated. This embodiment enables automatic control of the injection o the liquid reactant into the reaction chamber.

In this embodiment, the mobile wall is a piston and the means capable of being deformed are formed by a membrane forming a portion of the wall of the tank, in which a force exerted on said wall toward the inside of the tank causes an increase in the pressure of the liquid reactant contained therein.

In addition, the membrane is replaced with at least one gas bubble contained in the liquid.

The means for preventing a movement of the mobile wall in a direction of increasing the volume of the tank are of the pawl type acting on the injection tube.

Advantageously, the solid element is capable of being passed through by a gas, in order to facilitate the collection thereof. It can be associated with a porous component that improves the passages of the $H_2$, and therefore the discharge thereof, for example alumina or graphite. The reactant can be associated with a compound that is porous and inert with respect to the reactant.

In a hydrogen generating device, the solid element is a hydride and the liquid reactant is an aqueous solution. The aqueous solution can advantageously comprise a catalyst formed by platinum, nickel, Ru, $CoCl_2$, malic acid, or hydrochloric acid.

The the solid element can also be $CaC_2$ and the liquid reactant can be an aqueous solution, making it possible to generate acetylene, or the solid element can be $Cl_3CCH(OH)NHCOOC_2H_5$ and the liquid reactant can be an aqueous solution, making it possible to generate chlorine, or the solid element can be manganese oxide and the liquid reactant can be hydrochloric acid, making it possible to generate chlorine, or the solid element can be sodium peroxide and the liquid reactant is an aqueous solution, making it possible to generate oxygen.

The liquid reactant and/or the solid element can comprise a catalyst of the reaction between the liquid reactant and the solid element.

The liquid reactant can comprise a catalyst formed by platinum, nickel, Ru, $CoCl_2$, malic acid, or hydrochloric acid.

In another embodiment, solid element is a catalyst for generating a gas when the liquid reactant is in contact with it.

Then, the liquid reactant can be an aqueous solution containing a hydride and a stabilizer, for example sodium hydroxide, and the catalyst is platinum, ruthenium, cobalt or a cobalt and boron alloy.

The solid element can comprise a substrate, advantageously porous, on which the catalyst is deposited.

This invention also relates to an electrical power supply comprising a fuel cell and at least one hydrogen generating device according to the invention, in which said at least one hydrogen generating device is pneumatically connected at the level of its collection outlet to the fuel cell so as to supply it with gaseous hydrogen.

This invention also relates to a portable electrical element comprising an electrical power supply according to the present invention.

BRIEF DESCRIPTION OF THE DRAWINGS

This invention can be better understood with the following description and appended drawings, in which.

DETAILED DESCRIPTION OF SPECIFIC EMBODIMENTS

In the following description, the generating device according to this invention will be described as a hydrogen generator for a fuel cell, but this invention is suitable for generating other gases by contacting a solid element with a liquid reactant, used by devices other than a fuel cell.

Moreover, for the purpose of simplification, we will discuss hydrogen gas, but it is in fact dihydrogen H2.

Figure 1:
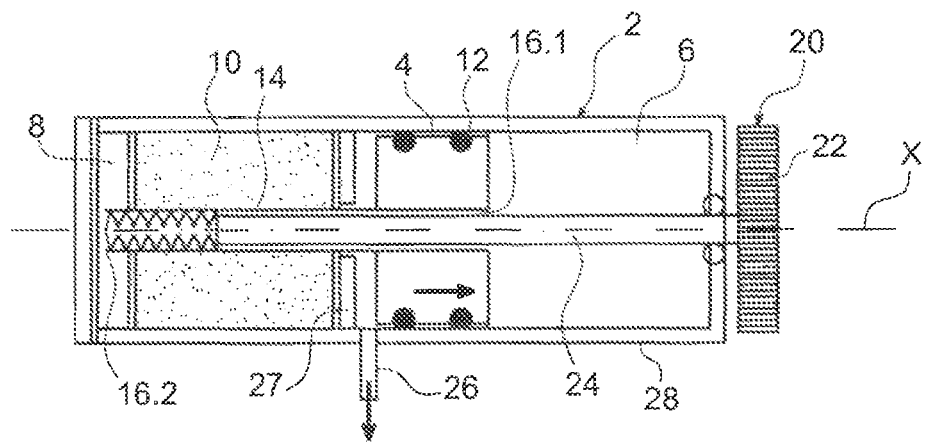
FIG. 1 is a diagrammatic longitudinal cross-section view of a hydrogen generating device according to the present invention with manual activation.

FIG. 1 shows a first embodiment of a hydrogen generating device according to this invention, comprising a casing 2, delimiting an internal volume V with a longitudinal axis X, in which a piston 4 is slidingly mounted according to the axis X. The piston 4 separates the volume V into a tank 6 intended to contain an aqueous solution and a reaction chamber 8 intended to contain a solid reactant 10.

The piston 4 slides in a sealed manner into the housing 2, for example by means of O-rings 12 mounted on its external periphery and rubbing on an internal wall of the housing 2.

The hydrogen generating device according to the first embodiment also comprises means 14 for injecting the aqueous solution or liquid reactant into the reaction chamber 8 from the tank 6.

In the example described, the injection means 14 move integrally with the piston 4.

The injection means 14 comprise an injection tube 16 passing through the piston 14 and with an axis X and fluidically connect the tank 6 and the reaction chamber 8.

For example, the tube 16 is mounted in an axial passage 18 formed in the piston 4, which mounting is performed in a sealed manner so as to prevent liquid leakages between the piston 4 and the tube 16.

The tube 16 then comprises a first axial end 16.1 leading into the tank 6 and a second axial end 16.2 opposite the first axial end 16.1 and leading into the reaction chamber 8.

The injection end 16.2 therefore moves axially into the solid reactant when the piston 4 moves.

The hydrogen generating device according to the first embodiment also comprises means for moving the piston 4 axially, which movement means 20 are actuated manually.

According to this invention, these means 20 comprise a thumb wheel 22 outside of the housing 2, which thumb wheel rotates integrally with a shaft 24, which shaft 24, of axis X, penetrates the injection tube 16, and which shaft 24 comprises an external threading cooperating with an internal threading formed on an internal wall of the injection tube 16, thus forming an endless screw. Thus, a rotation of the thumb wheel 22 causes a rotation of the shaft 24 and a sliding along the axis X of the injection tube 16 and therefore of the piston 4 integral with said injection tube. Depending on the direction of rotation applied to the thumb wheel 22, the piston 4 moves toward one or the other of the longitudinal ends of the housing 2 of the generator according to this invention.

According to this invention, the external threading of the shaft 24 and the internal threading of the injection tube 16 are formed so that they enable the flow of the liquid reactant contained in the tank 6 between the shaft 24 and the internal wall of the injection tube 16 into the reaction chamber 8. It is possible, to facilitate the flow of gas, to produce axial grooves in the external threading and/or the internal threading extending over the entire length of the shaft and/or the tube, respectively.

The invention also provides means for discharging the gaseous hydrogen generated by contact between the liquid reactant and the solid reactant in the reaction chamber, which means 26 are formed in the example by a collection tube provided on a lateral wall 28 of the housing 2 at the level of a free space between the piston 4 and a transverse wall 27 on the side of the solid reactant.

The wall 27 is integral with the housing 4 and is mounted perpendicularly to the axis X; it comprises a central passage through which the injection tube 16 passes.

The wall 27 is not mounted in a sealed manner in the housing 4 so as to enable the flow of gaseous hydrogen in the direction of the collection tube 26.

To enable the discharge of gaseous hydrogen, in particular the flow of gas between the reaction area between the liquid reactant and the solid reactant and the collection tube 26, the solid reactant is porous to the gas so as to enable the passage thereof.

The porous reactant offers porosity enabling the passage of the gas generated. It may or may not be in the form of a compacted powder. It is possible to combine this reactant with balls of a neutral material in order to facilitate the gaseous flow.

We will now explain the operation of the device according to the first embodiment of this invention.

Initially, the tank 6 is filled with liquid reactant, in particular an aqueous solution that may or may not contain a reaction activator solubilized in said solution, and the reaction chamber 8 is also filled with a solid reactant, for example NaBH4. To begin the production of gaseous hydrogen, the thumb wheel 22 is actuated so as to cause a movement of the piston in a direction of reducing the volume of the tank 6 toward the right-hand side in FIG. 1. The liquid reactant contained in the tank 6, due to a reduction in the volume thereof, tends to flow in the injection tube 16 between the external threading and the internal threading to an end 16.1 of the injection tube 16. When the liquid leaves the tube 16 through the end 16.2, it comes into contact with the solid reactant 10, which causes the generation of gaseous hydrogen according to the reaction:

$$NaBH_4 + 2H_2O \rightarrow NaBO_2 + 4H_2 \tag{I}$$

The gaseous hydrogen thus produced is then discharged through the collection tube 26 in the direction of a fuel cell, in particular a micro fuel cell, so as to react with the hydrogen in the air in order to form water and electrons according to the following reaction:

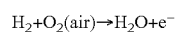

$$H_2 + O_2(air) \rightarrow H_2O + e^-$$

As the injection tube 16 moves integrally with the piston 4, the rotation of the thumb wheel in a direction of reducing the volume of the tank 6 causes a movement of the end 16.2 of the tube, and consequently, the area for injection of the liquid reactant is modified, and more specifically shifted axially, and follows the movement of the end 16.2 of the tube 16. In the example shown in FIG. 1, this end 16.2 moves axially to the right-hand side.

Thus, the liquid reactant comes into contact with the solid reactant 10 in different reaction sites. In other words, the solid reactant onto which the liquid reactant is injected is constantly renewed.

This device has the advantage of being compact and extremely simple to produce. It makes it possible, with a manual control, to generate, on-demand and with high production efficiency, to produce the hydrogen required for the production of electricity of the portable device.

Since the cartridge is provided so as to cause a fuel cell to run, an indication of an electrical parameter, such as the voltage or intensity, can then be used to inform the user of the need to turn the thumb wheel in order to restart the production of $H_2$.

Figure 2:
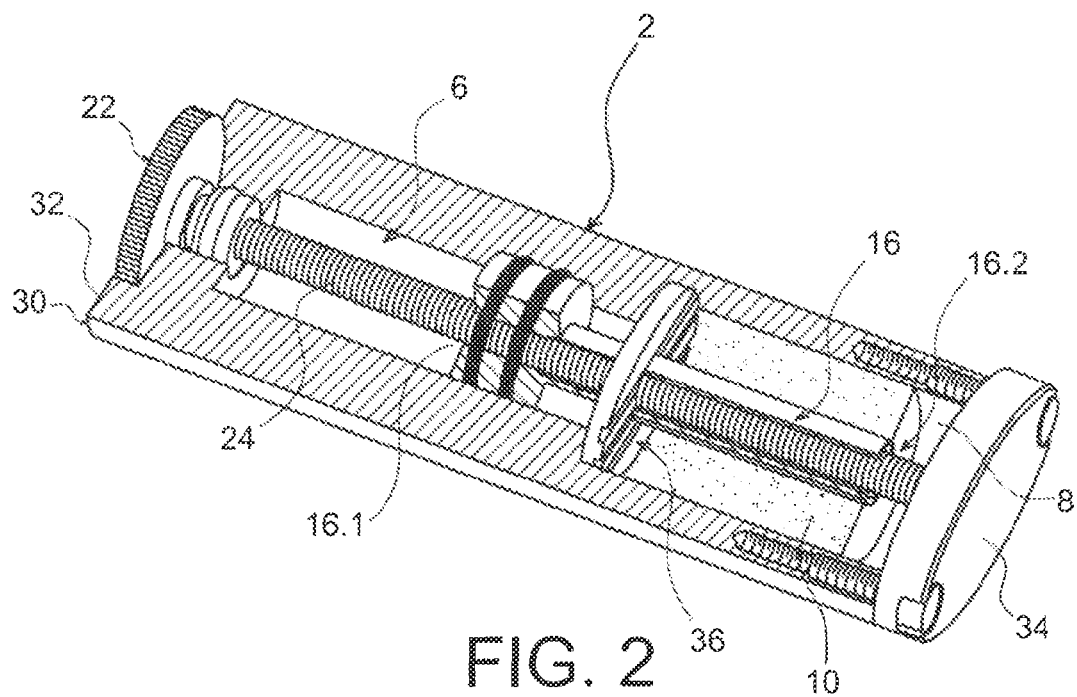
FIG. 2 is partial perspective view of a practical embodiment of the device of FIG. 1.

FIG. 2 shows an industrial embodiment of the device according to the first embodiment of this invention shown in FIG. 1; for example, the housing comprises a tube 30 equipped with a base 32, for example made of polycarbonate, and a lid 34 closing the other end secured to the tube by screws.

As shown in FIG. 2, the seals 12 are mounted in grooves formed in the external periphery of the piston 4.

By way of example, the device can measure 8 cm long and contain 2.1 cm$^3$ of liquid and 4 cm$^3$ of solid reactant. The diameter of the piston can be 12 mm with a course of 24 mm. It is of course possible to provide devices with larger or smaller dimensions, and the reaction chamber and the tank can have a capacity of up to several dozen cm$^3$. The size of the gaseous hydrogen generating device of course depends on the amount of hydrogen required by the fuel cell and more generally by the portable device powered by the fuel cell.

Advantageously, the piston and the tube are made of a single piece, for example by molding. Therefore, it is not necessary to provide a tube attached in the piston 4.

The piston as well as the tube can be made of a plastic material compatible with the reactive materials used.

Figure 3:
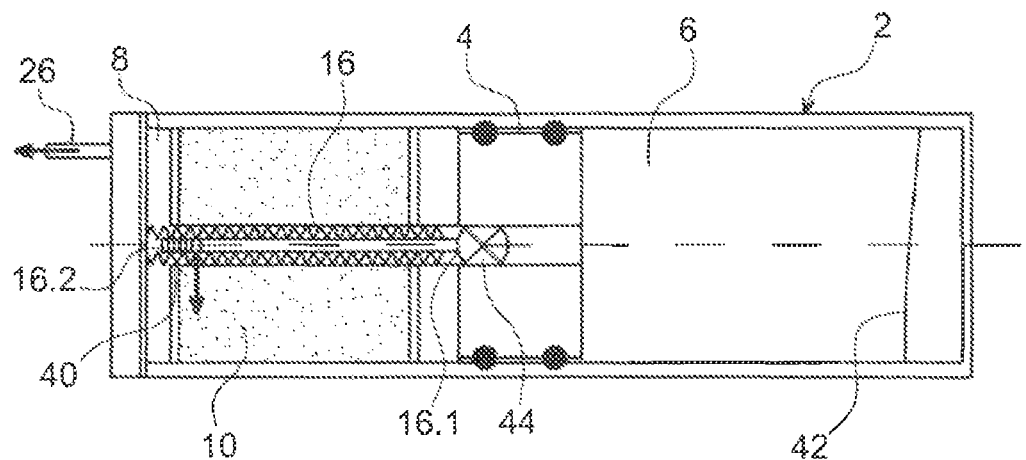
FIG. 3 is a diagrammatic longitudinal cross-section view of an alternative embodiment of the device of FIG. 1, in which the activation is performed by an electric motor.

FIG. 3 shows an alternative of the first embodiment of a gaseous hydrogen generating device according to this invention, different from the device of FIGS. 1 and 2, in that the thumb wheel is replaced by an electric motor 44 driving a shaft 24 in rotation, and the piston 4 has been removed, and a flexible tank 46 forms the tank 6. In this alternative, the sealing of the tank is thus simplified.

In the device of FIGS. 1 and 3, it is also possible to produce a tank in the form of a flexible tank.

The injection tube 16 puts the inside of the tank 46 in communication with the inside of the reaction chamber 8. The flexible tank 46 can be attached in a sealed manner by a first end to a longitudinal end of the housing 2 and by a second end to a rigid washer secured to the tube 16 and through which the liquid can flow.

The shaft 24 comprises an external threading cooperating with an internal threading formed on the internal wall of the tube 16 similarly to the device of FIGS. 1 and 3. An activation of the electric motor 44 causes the shaft 24 to rotate and the tube 16 to move axially with respect to the tube 24. Depending on the direction of rotation of the motor, the internal volume of the flexible tank 46 is increased or decreased.

In the operation of this embodiment, the motor 44 turns in a direction of reducing the internal volume of the flexible tank 46 so as to cause, by reducing this volume, a flow of the liquid reactant in the direction of the reaction chamber 8 between the external and internal threadings.

Similarly to the first embodiment, the solid reactant is chosen so as to be porous, and more generally so as to enable the flow of gaseous hydrogen in the direction of a collection tube 26 provided on the lateral wall of the housing 4 in the example shown.

The electric motor can be started by the user or by a pressure detector on the cartridge or an intensity sensor on the fuel cell. For example, an electrical contactor connected to a pressure sensor measuring the hydrogen pressure at the level of the collection tube 26 can actuate the motor when the pressure goes below a predetermined threshold value.

Figure 4:
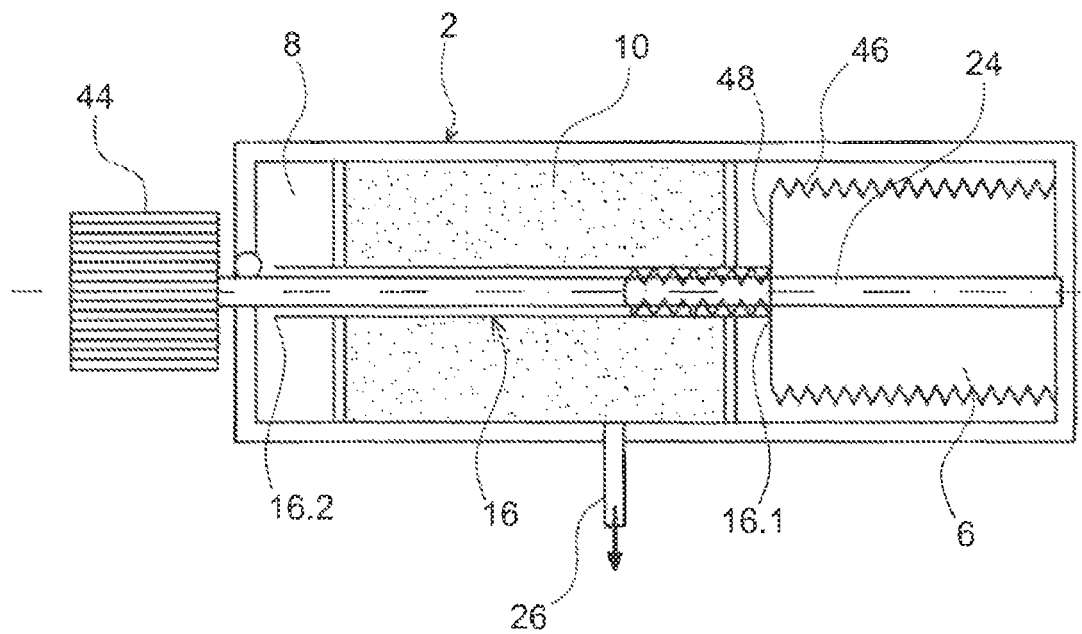
FIG. 4 is a diagrammatic longitudinal cross-section view of a second embodiment of a hydrogen generating device according to the present invention with automatic activation.

FIG. 4 shows a second embodiment of a gaseous hydrogen generator according to this invention having the advantage of offering automatic operation. According to this second embodiment, the injection of the liquid reactant onto the solid reactant is controlled automatically by the device without manual intervention by the user, and the injection of the solid reactant is controlled in a self-sustained manner by the hydrogen generating device.

The same references will be used for the devices having substantially the same form and performing substantially the same function.

The device according to the second embodiment shown in FIG. 4 differs from the device according to the first embodiment in that non-return valve means 38 are provided between the tank 6 and the reaction chamber 8 in order to prevent the gas generated in the reaction chamber from flowing into the tank.

In addition, a non-return pawl system 40 is provided so as to prevent the tube 16 and the piston 4 from moving in a direction of increasing the volume of the tank 6. Thus, when the liquid reactant flows from the tank 6 into the reaction chamber 8, and comes into contact with the solid reactant, gaseous hydrogen is generated, which causes an increase in pressure in the reaction chamber 8. The non-return valve 38 prevents the hydrogen gas from flowing into the tank, enabling pressure to increase in said reaction chamber 8. This increase in pressure causes force to be exerted on the piston 4, which slides according to the axis 6 in a direction of reducing the volume of the tank 6, which causes the liquid reactant to flow toward the reaction chamber 8.

The gaseous hydrogen collection tube 26 is provided in this embodiment at an axial end of the reaction chamber 8.

The discharge of gaseous hydrogen from the reaction chamber interrupts the sliding of the piston 4 in a direction of reducing the volume of the tank 6 and therefore interrupts the supply of liquid reactant to the reaction chamber 8.

According to this invention, since the injection tube 16 is axially secured to the piston 4, the injection end 16.2 of the tube moves axially into the solid reactant, the reaction zone, in particular the area of contact between the liquid reactant and the solid reactant is therefore constantly renewed.

The initiation of the reaction, in particular the beginning of the injection of liquid reactant into the reaction chamber 8, is caused by pressurization of the tank 6.

In the example shown in FIG. 4, the tank is at least partially delimited with a flexible membrane or any other deformable element so as to enable the piston to move into the chamber 6 and to enable the pawl to catch a new tooth as long as the non-return valve setting is not reached.

In the example shown, the membrane 42 is provided at a longitudinal end of the tank 6 opposite the piston 4.

Figure 6A:
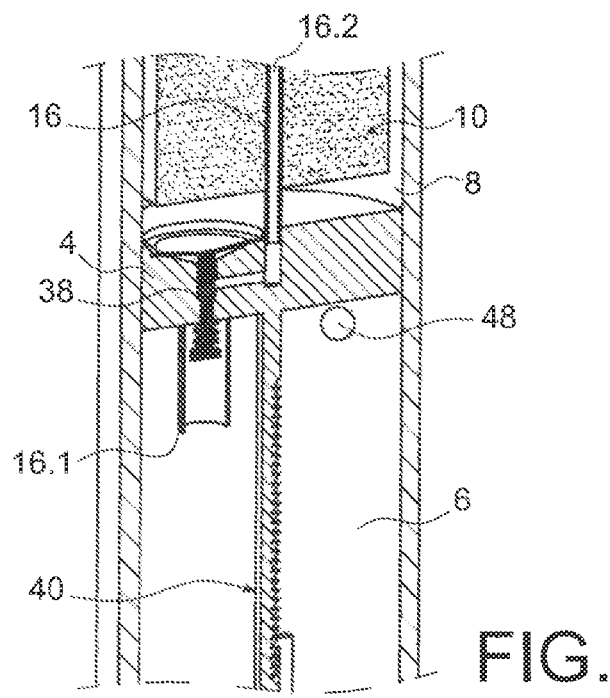
FIG. 6A is a longitudinal cross-section view of an industrial embodiment of the device of FIG. 4.
Figure 6B:
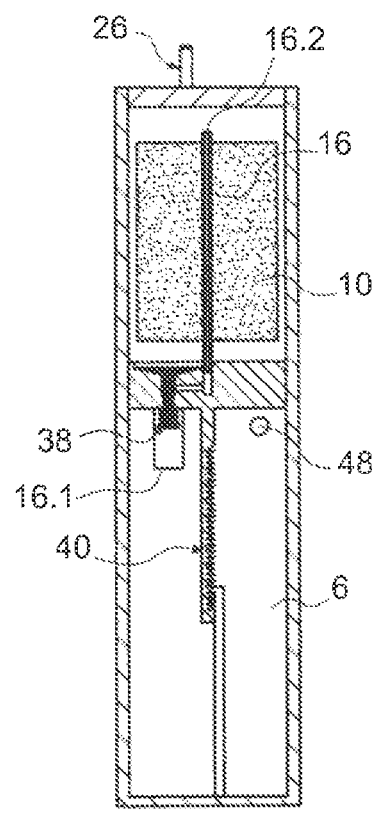
FIG. 6B is an enlarged perspective view of FIG. 6A.

FIGS. 6A and 6B show, in detail, the pawl system of the second embodiment, in which the flexible membrane 42 is replaced by a gas bubble 48, which, when compressed, enables the piston 4 to slide and therefore the pawl to move to a new tooth and thus the pressure of the liquid to be stored.

If a gas bubble 48 is used, means are provided in order to trigger the reaction.

Similarly to the first embodiment, the solid reactant is chosen so as to be porous, and more generally to enable the gaseous hydrogen to flow in the direction of a collection tube 26.

We will now explain the operation of the device according to the second embodiment.

When a stress is applied on the membrane 42 toward the inside of the tank 6, the tank 6 is pressurized when the pressure difference between the tank and the reaction chamber reaches the valve setting, the liquid reactant flows into the reaction chamber 8 through the tube 16.

The liquid leaves through the end 16.2 of the injection tube 16 and comes into contact with the solid reactant 10, generating gaseous hydrogen according to the reaction (I).

Since the hydrogen cannot escape to the tank due to the non-return valve, the pressure increases in the reaction chamber. The pressure difference between the tank and the reaction chamber is thus lower than the valve setting, and the valve closes and the flow of liquid from the tank to the reaction chamber is interrupted.

In addition, a force is applied on the piston 4, which moves in a direction of reducing the volume of the tank 6.

The hydrogen is collected by the duct 26, the pressure difference between the tank and the reaction chamber again reaches the non-return valve setting, and the liquid reactant is again injected into the reaction chamber 8. Thus, by controlling the hydrogen pressure in the reaction chamber 8, it is possible to control the injection of liquid reactant onto the solid reactant.

For example, filling the cavity isolated by the membrane 42 with a gas having a low boiling point, such as isobutene, for example, makes it possible to put said membrane under pressure.

It is of course possible to envisage the tank being formed by a pouch that can be fully deformed.

By way of an example, the movement of the piston occurs by the pressure appearing in the reaction chamber due to the generation of H2, the liquid pressure is stored by the pawl by compressing a gas bubble of 72 µl.

A valve set at 5 bars is chosen.

Each tooth of the pawl corresponds to a moved volume of 60 µl. For a piston diameter of 1.6 cm, the pawl step is therefore 0.3 mm.

A gas bubble of 72 µl at atmospheric pressure is therefore compressed to a maximum of 5 bars by moving the pawl by one tooth.

Thus, by choosing a maximum injected liquid volume of 60 µl, 120 $cm^3$ of $H_2$ is generated, and by choosing a dead volume of 24 $cm^3$ in the reaction chamber, a maximum pressure of 5 bars is reached in the reaction chamber.

This device has the advantage of ensuring an automatic injection of the liquid reactant onto the solid reactant without requiring manual intervention during the entire hydrogen generation period. It is enough to cause the pressurization of the liquid reactant at the beginning of the hydrogen generation step in order for the injection of liquid reactant to become self-sustaining.

The various embodiments of the hydrogen generating device described above can also be used to generate other types of gas. For example, it is possible to generate acetylene by reacting $CaC_2$ with water; to produce chlorine by reacting water with chloral urethane ($Cl_3CCH(OH)NHCOOC_2H_5$); to produce chlorine by reacting a hydrochloric acid solution with manganese oxide; or finally to produce oxygen by reacting water with sodium peroxide $Na_2O_2$.

Of course, these examples are in no way limiting, and the device according to this invention enables other gases to be produced.

In the embodiments described, the injection tube is attached to the mobile wall. Thus, the injection control and the movement of the injection area are coupled in a simple manner. However, a device in which specific coupling means are provided in order to associate the movement of the mobile wall with the injection tube does not go beyond the scope of this invention.

In the embodiments described above, a single injector was described, but it is of course possible to implement a plurality of injectors, in particular a plurality of injection tubes 16 mounted in parallel on the piston 4, for example in the first and second embodiments, in order to increase the amounts of liquid reactants injected onto the surface of the solid reactant and thus increase the amount of gaseous hydrogen produced at a given moment. The implementation of a plurality of injectors makes it possible to optimize the use of the entire cross-section of the solid reactant.

As we indicated above, the solid and/or liquid reactant can contain a catalyst, which catalyst can be platinum, nickel, Ru, $CoCl_2$, malic acid or hydrochloric acid.

In a third embodiment, it is possible to use not a solid reactant placed in the reaction chamber that will react with a liquid reactant stored in the tank, but a liquid reactant stored in the tank and a catalyst placed in the reaction chamber, in which the liquid reactant when injected onto the catalyst will release a gas.

For example, the reaction chamber contains a catalyst deposited on a substrate. For example, the catalyst is a metal such as platinum, ruthenium, cobalt or an alloy or a CoB metal alloy.

The substrate is, for example, a porous ceramic, a carbon foam or a metal foam, for example a nickel foam. The substrate can also be formed by a metal sheet on which the catalyst is deposited, for example by chemical reduction or by plasma deposition.

It is possible to use a single catalyst; however the production cost would be higher. The use of a substrate makes it possible to reduce the amount of catalyst and improve the distribution of the catalyst in the reaction chamber.

A porous substrate makes it possible to facilitate the discharge of the gas produced. In the case of a substrate non-porous to the gas, channels are provided in order to route the gas to the area of consumption.

The solid element formed by the substrate and the catalyst has a shape identical to that of the solid reactant in FIG. 2.

The tank stores the liquid reactant before it is injected into the reaction chamber. The liquid contains a reactant and a stabilizer. The reactant is intended to release a gas when it comes into contact with the catalyst. The stabilizer is intended to prevent the release of gas by the liquid reactant before it comes into contact with the catalyst.

If the gas to be generated is hydrogen, the reactant is, for example sodium borohydride or potassium borohydride, in a concentration of between 1% and 30% by mass; the stabilizer is, for example, sodium hydroxide or potash, in a concentration that can be between 0.1% and 20%. Indeed, in the alkaline medium obtained with sodium hydroxide, the aqueous hydride solution is stable; therefore there is no reaction, owing to the sodium hydroxide, between the water and hydride in the absence of catalyst.

The device comprises a structure similar to that already described, and the operation thereof is identical.

On command, the liquid reactant flows to the end of the mobile injection tube into the reaction chamber and comes into contact with the catalyst; the mobile injection point makes it possible to maintain access to the catalyst not yet used in the reaction.

By way of an example, the device according to the third example embodiment can be produced by depositing, by chemical reaction, a catalyst made of cobalt and boron on a carbon foam, which solid assembly is placed in the reaction chamber. An aqueous solution containing 15% by mass of $NaBH_4$ and 3% soda is stored in the container, and is ready to be injected onto the catalyst in order to produce hydrogen.

Figure 5:
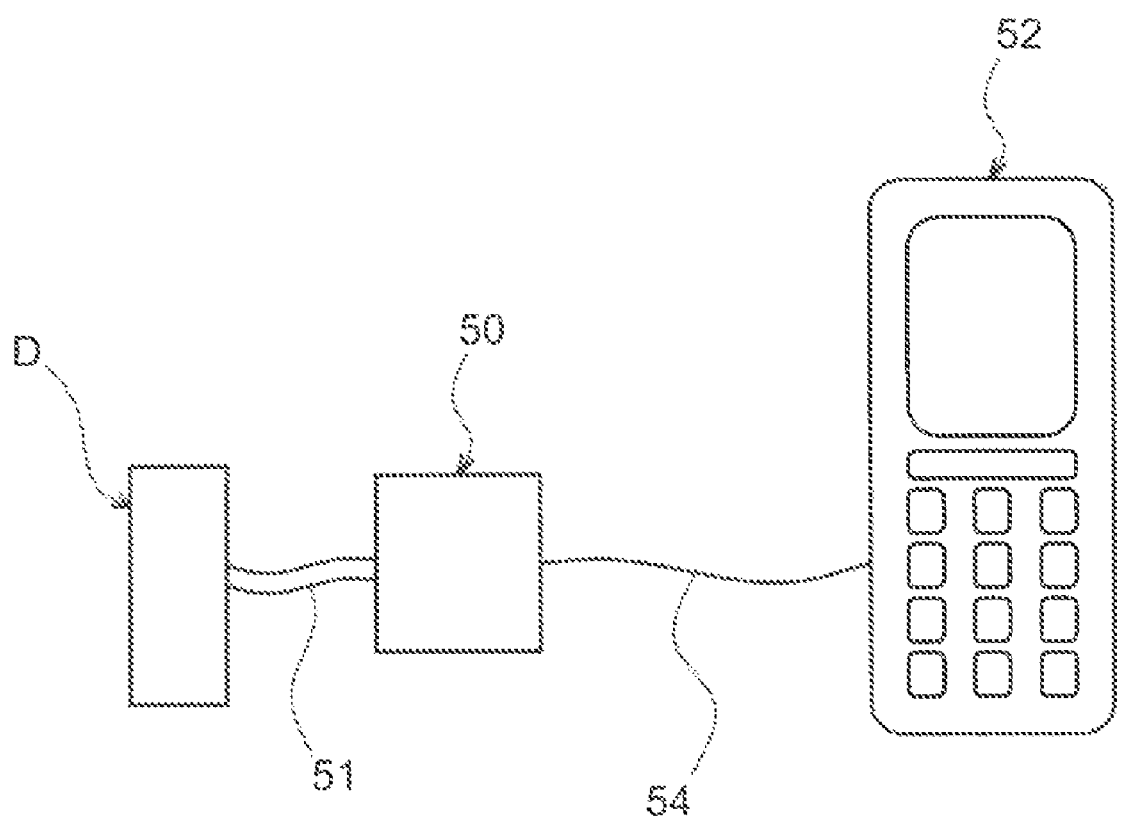
FIG. 5 is a diagrammatic drawing of a portable apparatus according to the present invention electrically powered by a fuel cell supplied with hydrogen by a hydrogen generating device according to the invention.

FIG. 5 shows a diagram of a hydrogen fuel cell 50 supplied with hydrogen by a device D according to the invention by means of a pneumatic duct 51, which fuel cell 50 supplies, with an electrical current, a device 52, preferably portable, by an electrical conductor 54.

This invention makes it possible to produce less bulky electrically-powered portable devices of which the production of electricity has a limited impact on the environment.

This fuel cell thus powered can be used to power portable telephones, portable computers or any other portable device requiring an electrical power supply.

By way of an example, the gas flow rate can be between 2 cm$^3$/min and 2000 cm$^3$/min. The period of operation can range from several minutes for high-power fuel cells (11 V-14 A) to several months according to the hydrogen consumption, for example in the case of a telephone operating by intermittence at 500 mA.

It is possible to recharge the tank by replacing the reactants or changing the cartridge in the case of a disposable system.

This system can be used in electrical vehicles by increasing the capacities and the diameters of the reaction chambers. It will then be necessary in this case to precisely and automatically control the reaction.

The invention claimed is:

1. A device for generating gas by placing a liquid reactant in contact with a solid element, comprising:
    a liquid reactant tank,
    a reaction chamber configured to contain the solid element,
    an injector configured to inject the liquid reactant onto the solid element,
    an outlet port configured to collect the gas generated in the reaction chamber,
    wherein the tank and the reaction chamber are separated in a sealed manner by a mobile wall, and
    wherein the injector passes through the mobile wall and is configured to move into the solid element.

2. The device according to claim 1, wherein the injector moves integrally with the mobile wall.

3. The device according to claim 2, wherein the injector comprises at least one tube passing through the mobile wall and connecting the tank and the reaction chamber.

4. The device according to claim 1, wherein the mobile wall is a piston, and a movement of the piston in a direction of reducing a volume of the tank causes the liquid reactant to flow from the tank toward the reaction chamber.

5. The device according to claim 1, wherein the tank is delimited by a flexible tank configured to be deformed so as to cause the liquid reactant to flow from the tank to the reaction chamber.

6. The device according to claim 1, wherein the mobile wall is connected to an endless screw mechanism.

7. The device according to claim 6, wherein the endless screw mechanism comprises a shaft equipped with an external threading cooperating with an internal threading formed in an internal wall of an injection tube, in which the shaft is configured to be rotated, and the liquid reactant can flow between the tube and the shaft.

8. The device according to claim 7, comprising a thumb wheel at one end of the shaft configured to be turned manually or by an electric motor engaged with an end of the shaft.

9. The device according to claim 1, comprising a non-return valve between the tank and the reaction chamber, means for preventing movement of the mobile wall in a direction of increasing a volume of the tank, and means for deforming under the pressure of the gas generated.

10. The device according to claim 9, wherein the mobile wall is a piston and the means for deforming are formed by a membrane forming a portion of the wall of the tank, in which a force exerted on said wall toward the inside of the tank causes an increase in the pressure of the liquid reactant contained therein.

11. The device according to claim 9, wherein the mobile wall is a piston and the means for deforming are formed by at least one gas bubble contained in the liquid.

12. The device according to claim 9, wherein the injector comprises at least one tube passing through the mobile wall and connecting the tank and the reaction chamber, and wherein the means for preventing a movement of the mobile wall in a direction of increasing the volume of the tank includes a pawl acting on the injection tube.

13. The device according to claim 1, wherein the solid element is capable of being passed through by a gas.

14. The device according to claim 13, wherein the liquid reactant is associated with a compound that is porous and inert with respect to the reactant.

15. The device according to claim 1, wherein the solid element is a hydride and the liquid reactant is an aqueous solution.

16. The device according to claim 1, wherein the solid element is $CaC_2$ and the liquid reactant is an aqueous solution, making it possible to generate acetylene, or the solid element is chloral urethane and the liquid reactant is an aqueous solution, making it possible to generate chlorine, or the solid element is manganese oxide and the liquid reactant is hydrochloric acid, making it possible to generate chlorine, or the solid element is sodium peroxide and the liquid reactant is an aqueous solution, making it possible to generate oxygen.

17. The device according to claim 1, wherein at least one of the liquid reactant and the solid element comprise(s) a catalyst of the reaction between the liquid reactant and the solid element.

18. The device according to claim 1, wherein the liquid reactant comprises a catalyst formed by platinum, nickel, Ru, $CoCl_2$, malic acid, or hydrochloric acid.

19. The device according to claim 1, wherein at the solid element is a catalyst for generating a gas when the liquid reactant is in contact with the catalyst.

20. The device according to claim 19, wherein the liquid reactant is an aqueous solution containing a hydride and a stabilizer, and the catalyst is platinum, ruthenium, cobalt or a cobalt and boron alloy.

21. The device according to claim 19, wherein the solid element comprises a substrate on which the catalyst is deposited.

22. An electrical power supply comprising a fuel cell and at least one device according to claim 1, in which said at least one device is pneumatically connected to the fuel cell so as to supply it with gaseous hydrogen.

23. A portable electrical element comprising an electrical power supply according to claim 22.

* * * * *